No. 684,357. Patented Oct. 8, 1901.
H. B. DIERDORFF.
MINING MACHINE.
(Application filed July 31, 1895.)
(No Model.) 7 Sheets—Sheet 1.
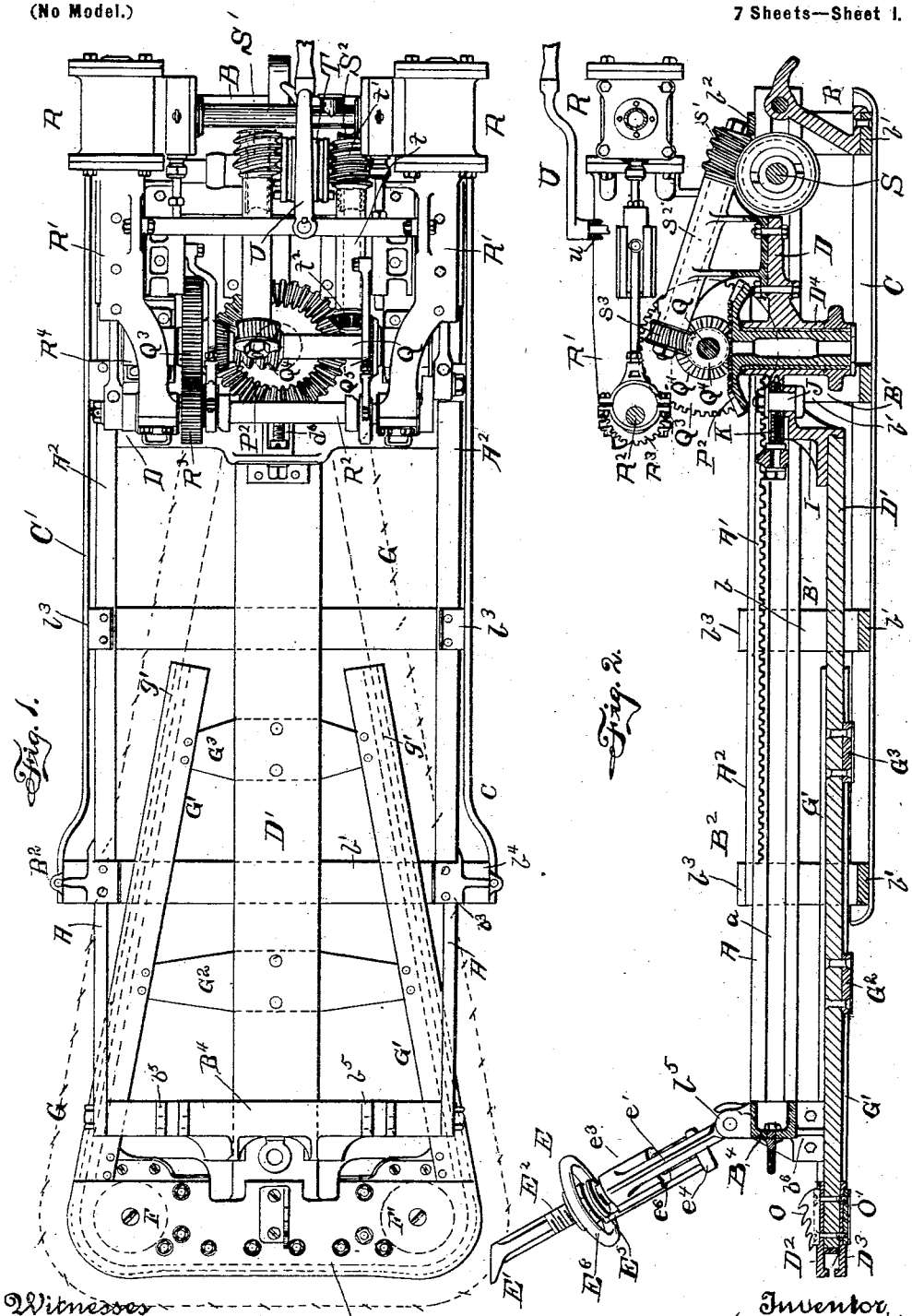

No. 684,357. Patented Oct. 8, 1901.
H. B. DIERDORFF.
MINING MACHINE.
(Application filed July 31, 1895.)
(No Model.) 7 Sheets—Sheet 2.
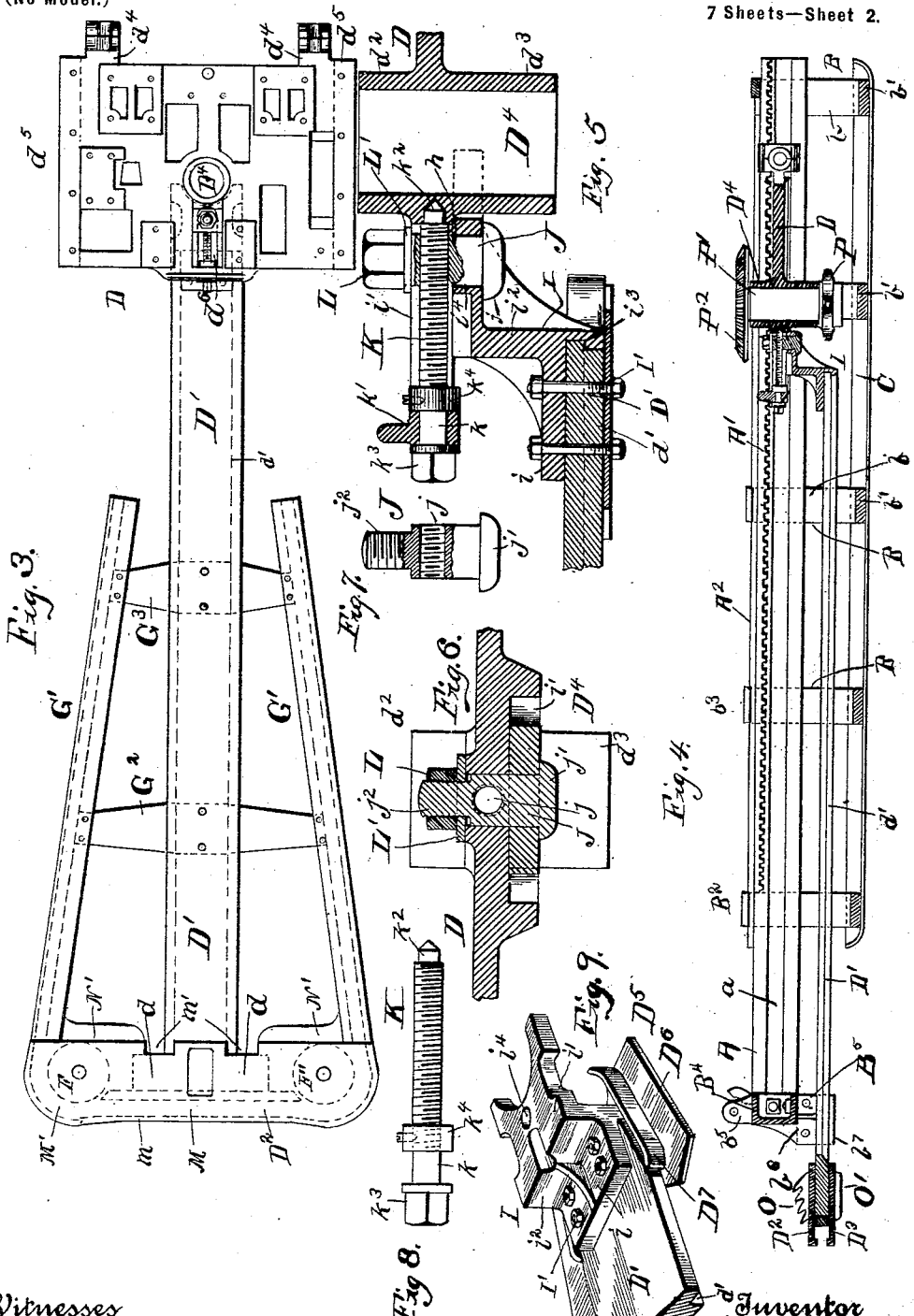

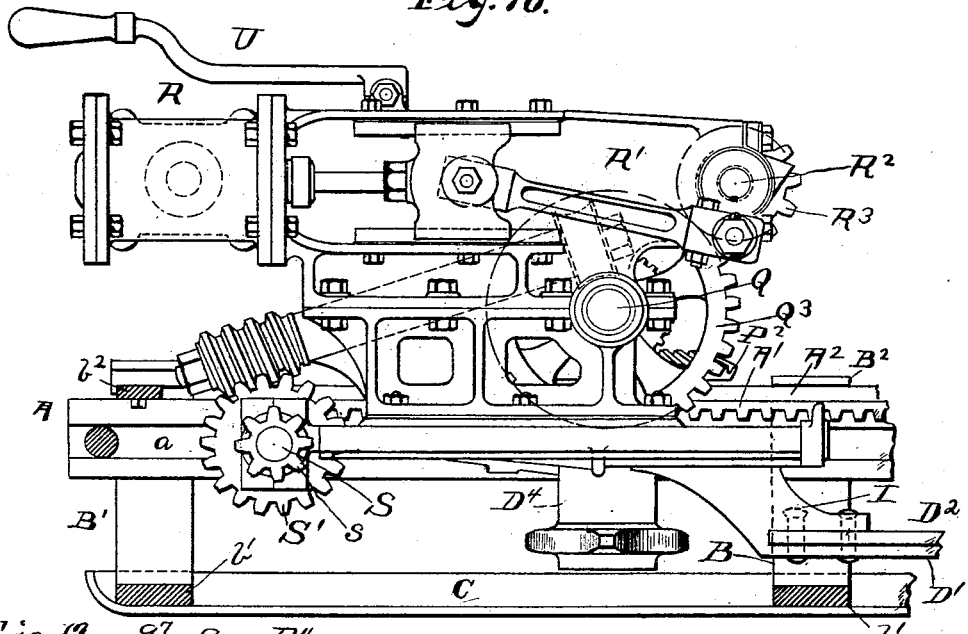

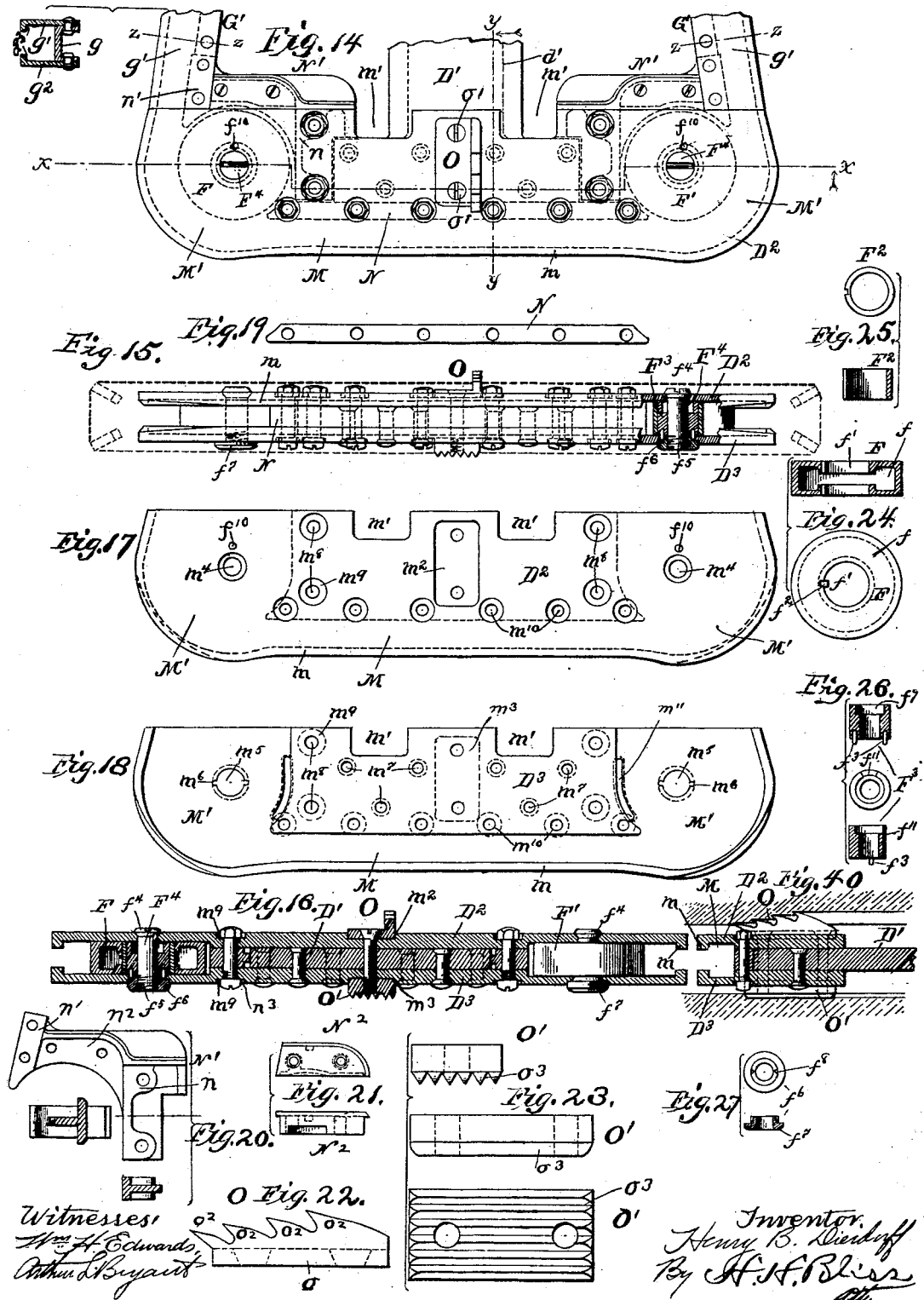

No. 684,357. Patented Oct. 8, 1901.
H. B. DIERDORFF.
MINING MACHINE.
(Application filed July 31, 1895.)

(No Model.) 7 Sheets—Sheet 5.

Witnesses
Wm H. Edwards
Arthur L. Bryant

Inventor
Henry B. Dierdorff
By H. H. Bliss
Attorney

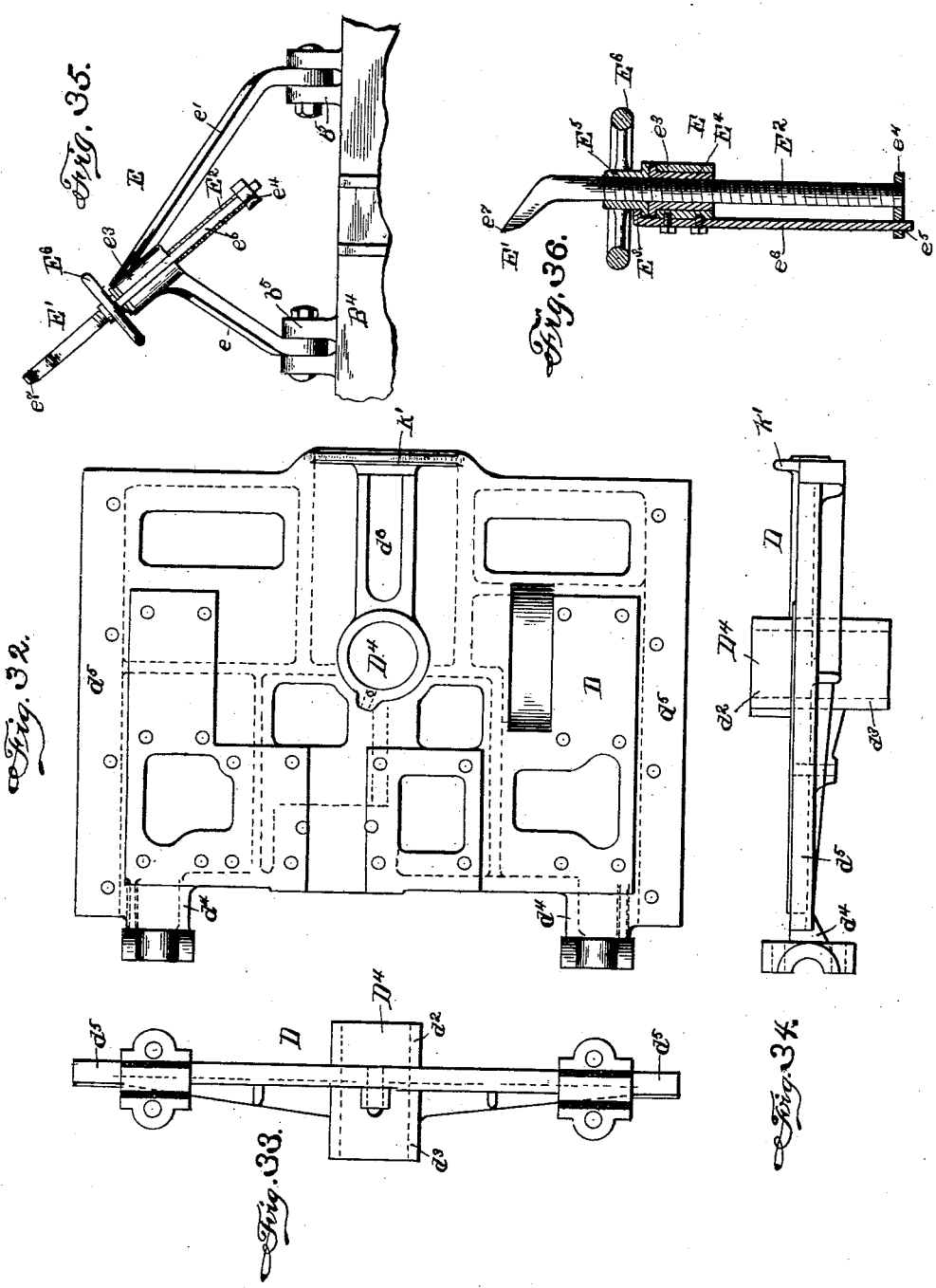

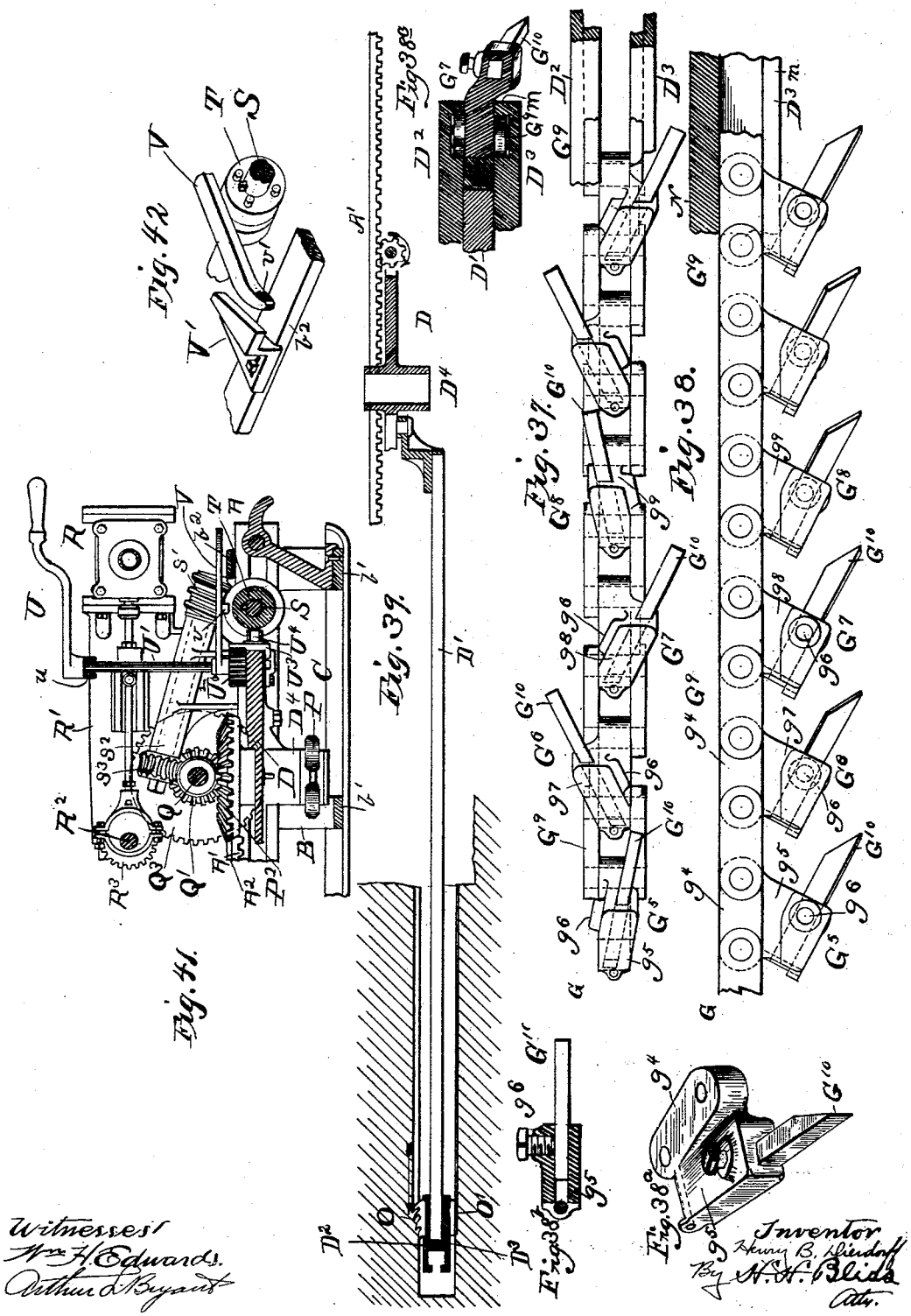

UNITED STATES PATENT OFFICE.

HENRY B. DIERDORFF, OF COLUMBUS, OHIO, ASSIGNOR TO JOSEPH A. JEFFREY, OF SAME PLACE.

MINING-MACHINE.

SPECIFICATION forming part of Letters Patent No. 684,357, dated October 8, 1901.

Application filed July 31, 1895. Serial No. 557,740. (No model.)

*To all whom it may concern:*

Be it known that I, HENRY B. DIERDORFF, a citizen of the United States, residing at Columbus, in the county of Franklin and State of Ohio, have invented new and useful Improvements in Mining-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 31:
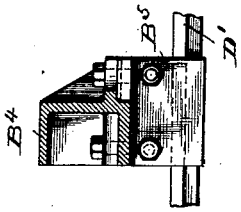
Figure 28:
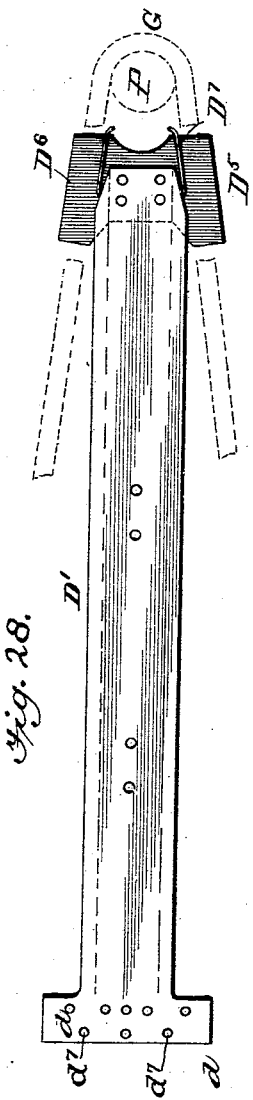
Figure 29:
Figure 30:
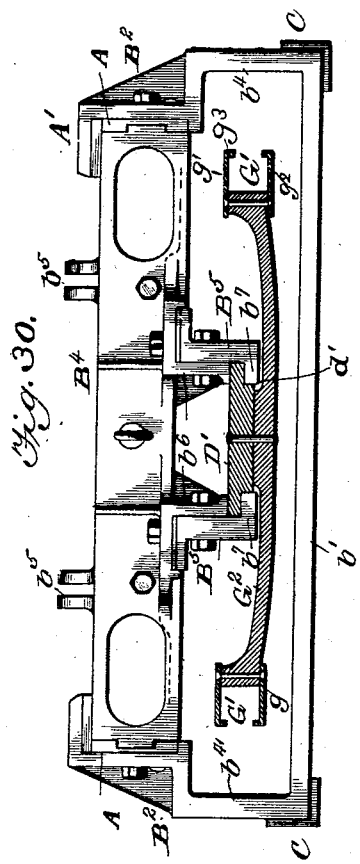

Figure 1 is a plan view, and Fig. 2 a longitudinal section, of my improved machine. Fig. 3 is a plan of the carriage detached, and Fig. 4 is a longitudinal section of the bed and carriage. Figs. 5 and 6 are sections, and Figs. 7 and 8 are details, of the chain-adjusting devices. Fig. 9 is a perspective of the rear end of the center bar and its connecting-plate. Fig. 10 is a view showing the bed-frame in section and the engine in side elevation. Fig. 11 shows the main power-shaft, and Figs. 12 and 13 show in section and elevation the ball-bearing on this shaft. Fig. 14 is a top plan view, Fig. 15 is a front edge view, and Fig. 16 is a transverse section, of the cross-head. Figs. 17 and 18 are plan views of the top plate and the bottom plate of the cross-head. Figs. 19, 20, and 21 show in detail parts secured to the cross-head. Fig. 22 is a side view of the stay device. Fig. 23 shows in end view, side view, and bottom view the shoe. Fig. 24 shows in section and plan one of the guide-wheels for the chain. Figs. 25, 26, and 27 show details of the devices for mounting the guide-wheels. Fig. 28 is a plan, and Fig. 29 a section, of the center bar. Fig. 30 is a cross-section of the carriage, and Fig. 31 a section through the center of Fig. 30. Figs. 32, 33, and 34 are a plan, rear view, and an edge view of the motor-carriage. Figs. 35 and 36 show the front jack in elevation and section. Figs. 37 and 38 show the chain in front view and plan. Figs. 38$^a$ and 38$^b$ are detail views of one of the chain-links. Figs. 39 and 40 show the manner of action of the stay. Fig. 41 is a section, and Fig. 42 a perspective, of the clutch-moving mechanism.

In the drawings a bed-frame or main frame is shown which is adapted to be made temporarily stationary while the cutting apparatus is at work, but which can be moved every few minutes, if desired. This bed has side bars A A, which are flat and are arranged with their widest dimensions in vertical planes and are formed with grooves or channels $a$ on their inner faces. At the rear ends these bars are joined by a cross-brace or connecting device B, which is preferably forged or otherwise shaped to have the vertical legs $b$, the bottom cross-bar $b'$, and the top cross-bar $b^2$. In front of this cross-brace B there are additional braces B', which are similar to that at B in that they have vertical legs $b$ and bottom cross-bars $b'$, but differ in that they have no top cross-bar, but have merely short inwardly-turned ends $b^3$. At B$^2$ there is another cross-brace, which also has a bottom bar $b'$ and short inwardly-turned top parts $b^3$, but which is peculiar in having the leg parts at the bottom carried considerably outward, as shown at $b^4$, for a purpose to be described. At the front ends the side bars A are joined and braced by another cross-bar B$^4$, which is different from those at B, B', and B$^2$ in that it lies directly between the bars. It can be formed as a casting made hollow, as shown in section in Fig. 2. It is formed with ears $b^5$, which extend upward for hinging the front jack, to be described. It is also cast with downwardly-extending plates or bars $b^6$, which form parts of the front guide for the chain-frame.

B$^5$ represents angular-shaped pieces which are bolted to the plates or bars $b^6$, the inwardly-turned lips or flanges $b^7$ serving as the lower part of the guideway for the chain-frame.

A' A' are rack-bars having downwardly-turned teeth and secured to the bed to form one of the members of the carriage-moving mechanism, they being fastened to the under side of the top bars A$^2$, which are bolted to the top edges of the side bars A.

C C are shoes or runners which are secured to the bottom parts of the braces B, B', and B$^2$ and are adapted to facilitate the moving of the machine and bed along the ground.

The front end of the bed-frame is held in position by an adjustable jack, (indicated as a whole by E.) It has a swinging main frame formed with a relatively short leg $e$, a relatively longer leg $e'$, and a connecting eye or tube $e^3$. The legs of this frame are hinged to the aforesaid ears $b^5$ on the front cross-bar B⁴. The tube $e^3$ is inclined instead of being in a perpendicular plane, as heretofore. The jack proper consists of a chisel-like or sharpened bar E', with a cutting edge at $e^7$ and having also a screw rod or stem $E^2$. With the latter there engages a nut at $E^5$, having a hand-wheel $E^6$ by which it can be turned in either direction. The nut bears in one direction against the sleeve $e^3$ (or against a thimble $E^4$ inserted into the latter) and bears in the other direction against the flanged bar at $E^3$. Hence by turning the hand-wheel in one direction or the other the screw-rod and the point or jack can be forced out or in. To prevent the jack from rotating, the screw-rod $E^2$ carries an ear-piece $e^4$, having an aperture at $e^5$, through which passes a guide-rod $e^6$, preferably integral with the part at $E^3$ and both bolted together to the tube $e^3$. A bracing-jack of this character successfully obviates much of the difficulty which has been experienced with machines of the class to which the present one belongs—that is, machines having cutters which move horizontally or side-wise. The powerful lateral strain exerted by such a cutting apparatus when the machine is at work causes it to move or tend to move in a direction opposite to the direction of travel of the chain. Not only is the advancing carriage-frame itself affected by this tendency, but the bed-frame itself tends to move the machine as a whole; but by arranging the jack, as described, so that it lies on a line inclined to the longitudinal planes of the machine and also inclined to the horizontal plane I can bind the bed powerfully in place against both vertical and lateral motion.

Upon the bed above described is supported a carriage or movable frame which supports the cutting apparatus, the shafting, the gearing, and the engine or motor. I prefer to construct this cutter-frame principally of a carriage plate or platform D, a single central supporting and thrusting bar D', and a cross-head at the front thereof, having a top plate $D^2$ and a bottom plate $D^3$. The carriage plate or platform D may vary in its details to adapt it for use with engines or motors of different sorts. It is fitted to the ways or guides at $a$ in the bed. The central bar D' extends forward from the carriage-plate D on the central longitudinal lines of the machine to points in front of the bed. At the front end it is expanded, as shown at $d\ d$, whereby a wide base of attachment is provided to the plates $D^2\ D^3$ of the cross-head. It is rabbeted at $d'$, so as to be snugly fitted in the guide provided by the above-described parts at $b^7\ b^6$. At the rear end the central bar D' is secured to an adjustable bracket I. As shown, this is formed with a lower plate $i$, an upper plate $i'$, and a vertical connection at $i^2$. The latter part extends below the plate $i$ and is provided with a shoulder at $i^3$, which fits under the rear end of the bar D'. The bolts at I' fasten the bar D' and the bracket I together, and the shoulder at $i^3$ serves to prevent the bar from twisting or straining the bolts and preserves the proper alinement of the bar. The plate or platform D is formed with a tubular bearing $D^4$ for one of the main shafts, the part $d^2$ of the tube extending somewhat above the plate D and the part $d^3$ extending below it. At $d^4$ there are backward-extending arms to provide bearings for the carriage-moving shaft. The parts at $d^5$ are those which are fitted in the grooves $a$ in the bed. At $d^6$ there is a slot wherein are placed the parts by which the adjustment of the bar D' and the plate D is effected. These adjusting devices are constructed and arranged as follows:

J is a nut having a threaded aperture $j$. Preferably it is of the form of a cylindrical pin or bar seated in an aperture $i^4$ in the upper part $i'$ of the bracket I and having a head $j'$, which holds it in proper place.

K is an adjusting-screw placed horizontally and adapted to pass through and engage with the threads in the aperture $j$ of nut J. Screw K has a smooth journal part $k$, mounted in a bearing at $k'$ in the plate D, and also has a smooth, though pointed, end $k^2$, stepped in a seat at the inner end of the slot $d^6$, the body of the screw K lying longitudinally along and in said slot. If a wrench be applied to the head $k^3$, the screw K can be turned, and it will, through its engagement with the nut J, cause the plate D to move in one direction or the other relative to the bar D' and the part I, and in this way the cutter-chain can be loosened or tightened, as required. The screw is held from motion in one direction by the collar $k^4$, which is rigidly fastened by a set-screw. After the parts have been properly adjusted, the nut J is firmly clamped in position by means of supplemental nut L, which engages with the threaded stem at $j^2$, there being a washer at L' to take the pressure of this nut L.

The cutter-chain as a whole is indicated by G. It moves outward to the front of the carriage, then across, and then backward in a substantially triangular path. The result of this arrangement is the saving of a large amount of power which has been wasted in those machines employing a polygonally-arranged chain running over wheels or guides between the driving-wheel and the front guide-wheels and which deflect the chain from the straight and direct paths at the sides which I provide. Moreover, I shorten the cutter-chain considerably—a very desirable matter to those acquainted with such machines, it being well known that the fewer the links, pivots, &c., the better. Again, the chain can be held from the disastrous whipping and vibrations incident to those in the earlier machines, it being possible in the present construction to employ long rearwardlyextending guides G' at the sides to hold it in the said triangular path. These guides are formed with an inner vertical wall $g$, a top wall $g'$, and a bottom wall $g^2$, the latter having lips or flanges at $g^3$, which prevent the chain from flying outward either on the outgoing or the incoming side. The guides are held by curved cross-bars $G^2$ $G^3$. The ends of these rise to the level of the guides G'; but at their centers they are shaped so as to pass under the thrust-bar D' and at the same time leave a free space adjacent to the rabbets $d'$, so that they (cross bars or braces $G^2$ $G^3$) shall not prevent the free movement longitudinally of the carriage by striking against any of the parts of the front guide.

The front plates $D^2$ $D^3$ of the cross-head may be of any suitable form; but I prefer to employ a cross-head having more or less of the following details:

The upper plate $D^2$ is formed with a groove M, communicating at the ends with cavities M', these being formed by cutting from the solid steel in such way as to leave a flange or lip $m$ around the outer edge and to provide spaces for the front chain-guiding wheels. At $m$ $m'$ the rear edge of the plate is recessed, so that the cross-head can be drawn back a considerable distance behind the front line of the bed, the depending guides at $b^6$ and $B^5$ entering these recesses $m'$. At $m^2$ the top plate is recessed to receive the holding device, to be described. The bottom plate is similar in outline to the top one, it being formed with a groove at M, cavities at M', a flange or lip $m$, recesses $m'$, and a seat or cavity $m^3$ to receive the shoe or holding-block, to be described. At $m^4$ holes are formed in the upper plate $D^2$ to receive the pintles or stud-pins of the chain-guiding wheels F F', and $m^5$ are corresponding holes in the lower plate $D^3$, $m^6$ being recesses at the side of the latter holes and for a purpose to be described.

$m^7$ represents rivet-apertures in the lower plate $D^3$.

$m^8$ represents bolt-apertures for fastening the two plates together, there being countersinks at $m^9$ in both the upper and the lower plates.

N is the bar which is placed between the two plates to properly space them apart at points near their front edges and also furnish a bearing-wall for the cutter-chain. $m^{10}$ represents countersunk apertures to receive the bolts which fasten this bar in place.

N' N' are the brackets or bracing-pieces which are used to space properly the end parts of the plates $D^2$ $D^3$ and also serve to connect them firmly to the guides G.

The wheels F F' are each constructed and arranged as follows: Each is cast hollow— that is, with a large interior chamber $f$ and a relatively large central aperture $f'$.

$F^2$ is a bushing secured by a key $f^2$. This bushing revolves upon a large wearing-surface provided by a thimble $F^3$. The thimble has a central vertical aperture and at the bottom is provided with two pins $f^3$. The latter extend downward through the recesses $m^6$, above described, in the lower plate.

$F^4$ is the bolt or pin which passes through the thimble $F^3$ and fastens the parts in place. It has a slotted head $f^4$ and is screw-threaded at $f^5$, and with it engages a nut $f^6$. The nut has a head $f^7$, which lies in a countersink of the lower plate $D^3$, and a tubular part with recesses $f^8$, which receive the lower ends of the pins $f^3$. It will now be seen that when either wheel F F' is put in place, together with its bushing and thimble, it can be held tightly in position by means of the screw $F^4$ and the nut $f^6$. At $f^9$ there is a cavity or chamber in the thimble $F^3$, adapted to hold more or less oil. At $f^{10}$ there is an oiling-aperture in the top plate $D^2$. Oil can from time to time be fed to the interior of the thimble and from there is slowly distributed through the passage $f^{11}$ to the bearing-surface of the thimble. When the parts are made in this way, the guide-wheels can be readily lubricated at any time and the lubricant retained and distributed slowly over a long period.

I am aware of the fact that it has been common to supply lubricant to wheels through tubular or sleeve-like journals, spindles, and axles and that chain-cutting mining-machines have been proposed each having a chain-wheel mounted upon such a sleeve-like journal. In the construction referred to the wheel was provided with a bushing revolving around the single interior piece forming the aforesaid sleeve-like journal, the latter having a thread and nut for drawing tightly up and down in the top and bottom plates. When the threaded parts are drawn tightly to place, there tends to be a forcing of the carriage-plates together, with a consequent clamping of or grip upon the wheel-bushing, increasing the wear and soon allowing the entrance of grit and dust to the bearing-surfaces; but in my construction it is impossible for the threaded parts to affect the distance between the top and bottom plates, as the thimble $F^3$ prevents this, although the interior binding-screw pin holds all of the parts firmly in place. This thimble is prevented from rotating by means of the dowel-pin, but permits the rotation of the screw within it.

The spacing and bracing parts (indicated by N') are each made with a bar $n$, which lies between the plates $D^2$ $D^3$, a rearward-extending-bar $n'$, and webs, as at $n^2$. The bolts $n^3$ pass through the bar $n$. The bars $n'$ serve to receive and firmly hold the front ends of the side guides G' of the chain.

$N^2$ is a closing-cap for closing the chamber behind the guide-wheel F or F' and serving to prevent the entrance of any cuttings or grit.

The central bar D' of the carriage is fastened to the cross-head in the manner indicated by Figs. 14, 15, and 16—that is to say, it is secured by rivets passing through the apertures $d^7$ in its front end and through the apertures $m^7$ in the lower plate $D^3$ of the cross-head. The bar is forged or otherwise shaped to have a T-head, as shown in Fig. 28. After it has been thus riveted to the lower plate $D^3$ the top plate $D^2$ is detachably fastened thereto by means of the bolts which pass through the apertures $m^8$ and $m^{10}$. When the parts are constructed and related in this way, I am enabled at any time to remove the upper plate $D^2$, either for the purpose of cleaning out the chain-guides and wheel-chambers, which frequently become clogged with grit and cuttings, or for the purpose of removing broken or worn parts and substituting new ones. This overcomes serious difficulties experienced in using earlier machines of this sort, which have had the carriage-bars and the cross-head secured together by rivets to form a unitary structure and requiring the laborious operation of cutting the rivets when the parts were to be separated and of subsequently riveting them. At $m^{LL}$ I form escape-passages in the lower plate for any dirt or cuttings which may find access to the wheel-chambers.

O indicates as a whole the stay device—that is, the device which acts to prevent the carriage from being thrust laterally in a direction opposite to the travel of the chain by reason of the engagement of the chain-cutters with the coal. It is formed with a plate $o$, which is placed in the above recess $m^2$ in the top plate and is secured by bolts or screws $o'$ and has one or more upwardly-projecting points $o^2$. The latter are pushed forward constantly by the carriage and its feeding mechanism and are held continuously in engagement with the coal. By having a series of these points, one above and behind another, they not only multiply the points of holding, but successively remove the coal or a thin layer thereof, so that an insignificant amount of power is required for clearing a path for them.

On the under side of the lower plate $D^3$ there is placed a shoe or projection $O'$, which is adapted to ride on the bottom of the chain-kerf and prevent the carriage from yielding downward either because of its weight or because of any downward thrust that may be caused by the stay O. It is seated in the cavity $m^3$ and is held by the same bolts or screws $o'$ which fasten the stay. On its under side it is preferably corrugated or roughened. As shown, it has a series of longitudinal ribs $o^3$, which assist the stay if preventing lateral motion of the carriage. By examining the drawings it will be seen that the cross-head when viewed in plan is recessed at the central part or rectilineal part—that is to say, the chain-guide near the wheels F F' projects somewhat farther forward than it does at the central part. The result is that as the chain goes around the wheel it is held well forward and prevented from "buckling" to the same extent that it does when carried across in the ordinary manner on a line which is tangent to the outer parts of the curve of its path around these wheels.

The chain which I have herein shown and which I have found to be superior for this purpose is more particularly illustrated in Figs. 37 and 38. It is constructed with strap-links $G^9$, alternating in pairs with the cutter-links. The cutter-links are arranged in a number of series, each series having links, such as at $G^5$, $G^6$, $G^7$, and $G^8$. Each has a draft part $g^4$ and a lug projecting forward and backward. The lug $g^5$ on the link $G^5$ lies largely in the central horizontal planes of the chain. It has a cutter-aperture inclined slightly downward and a set-screw aperture at $g^6$ on the upper side. The cutter-link $G^6$ has a lug $g^7$, which is very sharply inclined upward and has a correspondingly-arranged cutter-aperture with a set-screw socket $g^6$ on the under side. The link $G^7$ has a correspondingly sharply inclined lug $g^8$, which is turned downward and formed with a set-screw socket $g^6$ in its upper side. The link $G^8$ has a lug $g^9$, which is inclined upward, but not to the same extent as the lug on the link $G^6$, and having a set-screw socket on its under side.

The cutters are indicated by $G^{10}$. They are all similar to each other and are formed by cutting short sections from a straight bar of steel and properly sharpening the ends. The bent or crooked cutters, which have been largely used in chain-cutting machines, have been a source of much inconvenience and much trouble. When a link is provided which will carry a straight cutter at the proper angles, the labor and expense of shaping and bending the cutters heretofore used are avoided, and the straight cutters can be made and applied readily by unskilled laborers. Cutters of straight pieces of steel have been used; but the links to which they were attached supported them, so that they were held in vertical planes at right angles to the chain-links, and consequently their action on the coal was a dragging action. By arranging the chain-lugs in the way described herein the cutters are held in such manner as to act like chisels or the cutters of a planing machine. When the cutters are arranged in the way shown in Figs. 37 and 38, there is some tendency to their moving backward longitudinally in their sockets. To prevent their moving beyond a limited distance, I insert pins $g^{10}$, the rear ends of the lugs being provided with ears to receive these pins. By having the cutters arranged in a series of sets, as at $G^5$, $G^6$, $G^7$, and $G^8$, the points can be arranged to traverse the coal on four distinct lines, and thus act with the greatest efficiency in forming the kerf.

At the rear end the carriage-bar D' is provided with a guide and support $D^5$. This is adjacent to the driving sprocket-wheel and supports the chain as it moves to and from the latter. There are both horizontal and vertical wings or plates, as shown at $D^6$ $D^7$.

The chain is driven by the sprocket-wheel P, which is on the lower end of the shaft P′, mounted in the tubular bearing D⁴ and carrying the bevel-wheel P² at its upper end.

Q is a shaft mounted transversely of the machine. It has a bevel-wheel Q′, engaging with the bevel P², a spur-wheel Q³, through which it receives power, a worm Q⁴, by which it actuates the carriage-advancing mechanism, and a bevel Q⁵, by which it drives the carriage-withdrawing mechanism.

R indicates two engines. They are supported by means of standards or uprights R′, which are secured to the engine-plate D. The aforesaid shaft Q is mounted in these standards and also the crank-shaft R². The latter is connected by a prime pinion R³ with the large spur-wheel Q³, so that relatively light engines can be employed, moving with a high speed, and yet the operative parts be driven with only the required speed.

The carriage is moved by means of the shaft S, having pinions s, which engage with the racks A′ on the bed.

S′ and S² are worm-wheels mounted loosely on the shaft S, the former being driven continuously in one direction and relatively slowly by the worm s′ on the rear end of the shaft s², the latter having at the front end a worm-wheel s³, engaging with the aforesaid worm Q⁴ on shaft Q. The other worm-wheel S² on shaft S is continuously driven at a relatively higher speed by the worm t′ on the shaft t, the latter having at the front end a bevel t′, actuated by the bevel Q⁵ on the shaft Q. The wheels S′ and S² are alternately engaged with the shaft S by means of a clutch T, which is splined to the shaft. It can be moved one way or the other by means of the lever U, secured to the upper end of the shaft U′, the latter being mounted in a cross-bar u, secured to the standards R′, and at the lower end being held by the carriage-plate D.

U² is a pinion on the lower end of the shaft U′. It engages with a rack-plate U³, which carries a pin U⁴, engaging with a groove in the clutch T. When the lever U is moved in one direction or the other, it causes the pinion U² to move the plate U³ and the clutch, and in this way a much more powerful leverage can be exerted than is the case when the lever alone is depended on. When the carriage is moving backward, the clutch is automatically disengaged from the wheel S² by means of a lever V, which is pivoted loosely on the shaft U′ and is provided with a pin v, that also rides in the groove in the clutch.

V′ is an adjustable cam secured to the rear part of the bed-frame and lying in the path of the lever V. When the curved end v′ of the latter strikes the cam, it is moved laterally and the clutch is thrown away from the withdrawing mechanism, and the carriage instantly stops before it has come back far enough to have any of the gearing strike the rear end of the bed.

One of the serious troubles that has been incident to mining-machines of this sort has arisen from the fact that a high pressure forward on the carriage is necessary to hold the cutters properly to their work when advancing. The motion for thus advancing the carriage is obtained from bevel-gears, worm-gears, or equivalent devices, such as shown in Fig. 11. These often cause a powerful end thrust upon their shaft, as that at Q, and this end thrust is transmitted to the bearings in which the shaft is mounted. Much of the power is lost from this cause, and the friction and resistance often become so great as to highly heat the parts. These difficulties I have overcome by the devices shown in Figs. 10 to 13. The bearings at R⁴ are supported on the standards R′. The shaft Q is extended through one of the bearings, and upon the outer side of the latter there is placed a pressure-plate or wearing-collar q. A short distance outside of this there is another pressure-plate, as at q′.

$q^2$ $q^3$ are steel balls arranged in two circles around the shaft and between the pressure-plates. The balls of one circle are kept separate from those of the other by means of a spacing-ring $q^4$. The outer plate q′ is held in place by means of a cap $q^5$, which has an aperture at $q^6$, through which passes the reduced end part $Q^6$ of the shaft.

$Q^7$ is a nut on the outer end of the reduced part of the shaft, and by means of it the cap $q^5$ can be clamped tightly against the shoulder on the shaft. To prevent loosening of the nut, a pin $q^8$ is passed through it. The cap $q^5$ has a flange $q^7$, which incloses the ball-chamber.

The end thrust on the shaft Q caused by the gearing is inward in the construction shown; but by using the parts last described the cramping which results from such thrust is avoided, as it is transmitted to the pressure-plates q q′ and is taken by the balls.

$Q^9$ is a washer interposed between the plate q′ and the bearing R⁴.

I am aware that it has been heretofore proposed to surround a power-shaft with two plates or disks and to arrange between the adjacent faces of said plates a series of antifriction-balls; but the construction and arrangement of parts above described and illustrated in the drawings possesses advantages over the constructions just referred to. It will be noticed that all of the parts of the devices for relieving the power-shaft of end thrust are arranged outside of the adjacent bearing of said shaft and between such bearing and the end of the shaft, and also that by removing a single nut $Q^7$ all of the parts of the ball-bearing can be readily withdrawn from the said shaft.

In an earlier application of mine, Serial No. 501,584, filed February 26, 1894, I have shown and described a machine which, broadly considered, presents features similar to some of those of the present one; but in several respects the machine herein shown I have found to be superior to my earlier one as well as any of the several other earlier ones of which I have knowledge.

By constructing the bed-frame in the way described in relation to the chain-frame—that is to say, by forming the bed with a narrower rear part and the wider part at the front end—I am enabled to make the machine at the rear much narrower and lighter than heretofore and at the same time can permit the use of a wide cutter-head or cross-head. This results from arranging the front bars of the bed as the vertical bars $b^4$, so that they shall be considerably farther from the vertical central longitudinal plane than are the vertical bed-bars $b$ toward the rear. Another matter of advantage lies in having the guiding and supporting bars or plates $D^5$ detachable from the bed. As these parts are apt to be severely strained and rapidly worn, it is necessary to remove them from time to time, and this is readily permitted in the present machine. So, too, the bar $D'$ can be easily taken out when the machine is to be repaired or overhauled. It is to be noted in this connection that all of the features of improvement are not limited to having the guide which supports the chain-frame arranged to depend or droop downward from the bed-bars instead of projecting upward from some other part of the bed. I prefer the arrangement shown for this guide, as it enables me to use strong braces $G^2 G^3$, which can pass under the guide. The present machine, like my earlier one, is characterized by having two guides on the bed, one for the chain-frame part of the carriage and the other for the frame or platform which supports the power devices, the former being relatively low and the latter being relatively high, with a considerable space vertically between them, this permitting the driving sprocket-wheel to be placed considerably lower than the racks and pinions which apply the advancing power, and by having the sprocket-wheel and the chain-frame thus considerably lower than the power-platform a free and unobstructed space or path is provided at all points for the cutters, many of which project considerably above and many below the horizontal planes of the chain-frame.

By examining Figs. 9 and 28 it will be seen that the central push-bar or supporting-bar of the chain-frame is relatively wide, although used in connection with a small driving sprocket-wheel, the bar being beveled or narrowed at its rear end, so that the chain can readily move to and from the wheels, and at points farther forward it is broader, so that it is adapted to withstand the severe transverse strains which it experiences when the machine is in use. The supplemental chain support and guide at $D^5$ insures that the chain shall be properly held at points in proximity to the drive-wheel. The side guides $G'$ for the chain do not extend entirely back to the bar $D'$, and consequently the carriage can be fed forward until the very rear end of the bar $D'$ comes to the guide at $D^5$. By forming the T-head on the bar $D'$, I provide an expanded base of attachment to the cross-head and furnish a prolonged abutment or brace for the bar N, against which the chain bears when cutting. By examining Fig. 6 it will be seen that the adjustable bracket I is fitted between two bars or ribs which project down from the power-platform, and it is by them held firmly in position.

In the present machine the stay device O and the shoe or runner $O'$ are independent of each other, differing in this respect from those in my earlier machines. By having them thus independent either can be withdrawn and a new one substituted without interfering with the other. Moreover, they can be arranged differently on the carriage, one being placed upon the top and the other upon the bottom, and not requiring the cutting of any slots or large apertures in the chain-plates. By examining Fig. 16 it will be seen that both the stay and shoe are largely held in place by means of shoulders on the cross-head, such shoulders being in this case provided by forming recesses in the plates. When so arranged, much of the strain and wear that would otherwise come on the bolts is obviated.

The advantageous arrangement of the power devices herein shown will be readily understood. All of these, including the shafting and gearing and engines, are arranged so as to attain the utmost economy in space and in the transmission of the power and to provide the utmost strength. The carriage-moving shaft $s^2$ is placed in the longitudinal planes of the bevel-gear $P^2$. The main driving-shaft Q and the pinion-shaft S are mounted transversely of the carriage and as close as possible together. The engines are pointed forward, and the crank-shaft $R^2$ is relatively lowered and placed on the front side of the shaft Q, the result of this relative arrangement of parts being that the machine as a whole is shortened and the power is divided by devices situated within a small area.

By examining Figs. 37, 38, $38^a$, $38^b$, and $38^c$ the peculiar features incident to the construction and arrangement of the parts of the chain and its guideway will be understood. It will be seen that each of the cutter-heads has a draft-bar part, which is pivotally connected to adjacent links, and a lug projecting outward therefrom, this lug having a relatively thinner neck and a thicker head portion outside of the neck, and that cutter-bars straight from end to end are used. Each cutter-bar is held in a socket in its lug in such way as to lie entirely outside of the draft-bar part of the link and is in lines which are inclined to the longitudinal vertical planes, the longitudinal horizontal planes, and the transverse planes of the draft part of the link and of the chain proper, the result being that the points of the cutters are projected forward relatively to the line of travel of the chain and projected outward beyond the lugs and are inclined upward or downward in relation to the horizontal planes of the chain. Hence a chisel cutting action can be attained instead of the dragging or tearing action incident to many earlier chains.

I have above described in detail the construction and mode of operation of the several parts of the machine illustrated, but wish it understood that I do not limit myself to such details of construction of arrangement so far as concerns the essential features of invention which I have presented, and in this connection it will be noted that when the parts are constructed and arranged in the way described there is produced a "front-thrust" chain mining-machine of superior character, in that a rigid support for the chain is provided having the prolonged side guides, the cross-head and the intermediate thrusting-bar, and the quadrangular platform for the power and gearing all rigidly connected together, the chain being held by its rigid guide in a triangular position, the base-line of the triangle being at the front and transverse to the line of advance. The chain under the strain of high power is moved at high speed directly forward from a small central drive-wheel along a rigid guide to the front wheel on a line tangential both to the drive-wheel and the front wheel, thence to the other front wheel, and thence directly back onto the small drive-wheel on a straight line tangential to both the latter, power being thus greatly economized, the chain-frame strengthened, the chain shortened, the chain-space reduced, a perfect horizontal kerf formed, and danger from the cutters at the rear part of the chain being obviated, all of which matters place such machine as the present one in contrast with the earlier chain-cutter machines, wherein use had to be made of four or more chain-wheels, generally five, holding the chain in a pentagonal path, which was requisite in order to carry the cutters around the sliding frame part.

I believe myself to be the first to have constructed a chain cutter mining-machine of this class with the chain supported, driven, and operating in a horizontal triangular path—that is to say, so that the chain-links move longitudinally around a triangle in horizontal lines, the triangle as a whole also moving horizontally into the coal, the chain being held by rigid guides to the sides of such triangle and moving as a whole in planes parallel to the guide-lines of the bed.

In my said earlier application, Serial No. 501,584, I illustrated and described a chain-frame having more or less of the chain-guiding parts held in place not rigidly but yieldingly. In the present machine I provide for a uniform and balanced bracing for the chain-frame on both sides by having the two side chain-guides interposed rigidly between the front cross-head and the central thrusting part, this not only insuring the necessary strength for the chain-frame, but also insuring that the feed-thrust from the cross pinion-shaft shall be distributed uniformly to both ends of the cross-head of the chain-frame. In the present application I prefer to claim those features of novel improvement which are incident to a machine such as that herein, not intending the present claims to be for the subjects-matter of the claims in said other application.

I herein refer at times to this machine as having a single central thrusting and guiding bar; but it will be understood that I do not thereby merely mean a single piece of metal, as substantially the same novel features of construction and arrangement can be attained if there be modification in this respect. The matter to note is that as concerns the central parts of the chain-support there is a guiding and thrusting device for the chain-frame so situated and arranged that it does not interfere with arranging the chain to travel, as aforesaid, in an approximately triangular path.

While for some purposes I employ an engine actuated by air, steam, or the like, yet it will be understood that an electric motor—such, for instance, as shown in my said other application—can be used.

What I claim is—

1. In a mining-machine, the combination of the chain provided with cutters, the sliding carriage supporting said chain, the means for driving the chain, and the bed-frame having the relatively narrow part at the rear and the relatively wider part at the front, both of said parts being provided with downwardly-extending bars which support the chain-frame from the ground and which lie outside of the space encircled by the chain and the downwardly-extending bars of the wider front part of the bed being on longitudinal lines outside of the downwardly-extending bars of the rear narrower part, substantially as set forth.

2. In a mining-machine, the combination of the chain provided with cutters, the sliding carriage which supports said chain, the means for driving the chain, and the bed-frame having the channel or guide bars for the chain-frame, downwardly-extending bars $b$ at the rear of the front end of the bed, and the downwardly-extending bars $b^4$ at the front end of the bed and farther apart transversely than the bars $b$, whereby the frame can be made narrow throughout the greater portion of its length, and yet permit the said bars $b$ and $b^4$ to serve as ground-supports for the chain-frame on vertical lines outside the space encircled by the chain, substantially as set forth.

3. In a mining-machine, the combination of the chain having cutters secured thereto, the sliding carriage for said chain having a plate or platform at the rear for supporting the engine or motor and a central guiding-bar, $D'$, projecting forward therefrom, and the bed-frame having longitudinal guide-bars supporting at the front end a cross-bar provided with a downwardly-extending guide formed with the detachable plates B⁵ and the supplemental plates b⁶, substantially as set forth.

4. In a mining-machine, the combination of the chain having cutters secured thereto, the sliding carriage for said chain having an engine plate or platform at the rear end and the central guiding-bar extending forward therefrom and formed with the rabbets d', and the bed-frame having longitudinal guide-bars provided at the front end with a depending guide formed of plates, as at b⁶, lying above the carriage-bar D', and the detachable guide-plates B⁵ having the lips b⁷ seated in the said rabbets d', substantially as set forth.

5. In a mining-machine, the combination of the sliding carriage, the bed-frame having the guide-bars for the carriage, and having at the front end a cross-brace as at B² secured to the said guide-bars and formed with the bottom bar b' and vertical parts b⁴ situated farther from the central vertical plane of the carriage than the said guide-bars and arranged to provide an open space or pathway below said bars, the cross-bar B⁴ arranged above the carriage and the horizontally-mounted chain supported on said carriage and adapted to travel in the said space or pathway below the guide-bars, substantially as set forth.

6. In a mining-machine, the combination of the chain, having the cutters secured thereto, the sliding carriage for the chain, and the bed having the relatively higher guideway for the rear part of the carriage, and a relatively lower guide or support for the front part of the carriage, the last said support being detachably secured to the bed and situated in a lower plane than the aforesaid guide, and said bed having the parts which support it from the ground arranged outside of and along the sides of the space occupied by the front and central parts of the chain when the latter is in its rearmost position, substantially as set forth.

7. In a mining-machine, the combination of the chain having the cutters secured thereto, the bed-frame, the sliding carriage for carrying the cutter-chain having at the front the chain-guiding wheels, F, F', the central bar D' for supporting and guiding the carriage, said bar being narrowed at its rear end whereby the chain can be placed on lines tangential to the rear wheel and the front wheels and wider in front thereof where it rests in its guide, and the relatively small driving sprocket-wheel at the rear end of said bar, substantially as set forth.

8. In a mining-machine, the combination of the chain having the cutters secured thereto and arranged in a triangular path, the bed-frame, and the sliding-carriage frame having a central longitudinal bar for supporting the front part of the carriage, the cross-head, the side chain-guides G' G', and the rear supplemental chain-guide D⁵ secured to the said central bar, substantially as set forth.

9. In a machine of the class described, the combination of the cutter-chain, the bed-frame having an upper guide and a lower guide, the carriage having a rear frame or platform supported in the upper guide, a connecting-bracket extending downward from said rear frame and adjustably secured thereto, and a chain-frame supported in the lower guide and having a longitudinal bar formed separately from and detachably secured to said bracket, whereby the said longitudinal bar can be relatively thick, wide and straight from end to end.

10. In a mining-machine, the combination of the chain having the cutters secured thereto, the bed-frame, the sliding carriage having the chain-frame bar D', the frame or platform for supporting the power devices, the bracket I extending upward from the bar D' to the last said platform, the detachable nut, as at J, secured to one of the said parts, and the adjusting-screw K secured to the other and engaging with the said nut, substantially as set forth.

11. In a mining-machine, the combination of the chain having the cutters secured thereto, the bed-frame, the sliding carriage having a chain-frame bar D', the frame or platform for supporting the power devices, the bracket I extending upward from the bar D' to said platform, a nut J detachably held by the bracket, means for clamping the nut to the platform, and the adjusting-screw K engaging with the nut, substantially as set forth.

12. In a mining-machine, the combination of the chain having the cutters secured thereto, the bed-frame, the sliding carriage having a chain-frame bar D', the frame or platform for supporting the power devices, the bracket I extending upward from the bar D' to said platform and fitted between vertically-arranged guide-shoulders on the platform, and means for adjusting the bracket forward and back between the said guide-bars, substantially as set forth.

13. In a mining-machine, the combination of the bed, the chain having the cutters secured thereto, and the carriage having a chain-frame provided with a cross-head at the front, said cross-head having a guide-wheel at each end and being narrower on longitudinal lines of the machine between the wheels than it is on the longitudinal lines through the wheels and provided with a stationary guide adapted to draw the chain backward or inward as it moves along the narrower part, substantially as set forth.

14. In a mining-machine, the combination of the bed, having a guide at the front formed of vertically-arranged bars or plates, and the carriage for supporting the cutter-chain having the central longitudinal bar D' and the cross-head at the front end of said bar, said head being recessed, as at $m'$, whereby its rear edge can be drawn back beyond the front edges of the aforesaid guide on the bed, substantially as set forth.

15. In a mining-machine, the combination of the bed, the chain having the cutters secured thereto, and the carriage having the cross-head formed of the upper plate $D^2$, the lower plate $D^3$, the chain-guide bar N, the brackets N', and the longitudinal bar D' having the laterally-expanded parts $d$ bearing against the bar N and lying between the plates $D^2$, $D^3$, substantially as set forth.

16. In a mining-machine, the combination of the bed, the chain having the cutters secured thereto, and the carriage having a chain-frame for supporting said chain provided with a cross-head at the front end and a longitudinal bar, said cross-head being formed of an upper and lower plate, rigidly secured together, and of which one is rigidly secured to the said bar independently of the other, substantially as set forth.

17. In a mining-machine, the combination of the bed, the chain having the cutters secured thereto, and the carriage having a cross-head at the front end for guiding the chain and a longitudinal supporting-bar, as at D', said cross-head being formed of a lower plate rigidly secured to the longitudinal bar, and an upper plate detachably secured to the lower plate, whereby the upper plate can be removed without entirely separating the longitudinal bar and the cross-head, substantially as set forth.

18. In a mining-machine, the combination of the bed, the chain having the cutters attached thereto, and the carriage for the chain having a longitudinal supporting-bar and a cross-head at the front thereof, said cross-head having a lower plate rigidly secured to the longitudinal bar, and an upper plate secured to the lower plate by removable bolts situated in bolt-apertures which are countersunk in the upper or lower plate or both, substantially as set forth.

19. In a mining-machine, the combination of the bed, the carriage having the cross-head formed of an upper and a lower plate, a tubular spacing device rigidly connected to one of said plates and extending across the space between said plates, a guide-wheel fitted around said tubular spacing device, a bushing connected to said wheel to rotate therewith and contacting with said interior tubular spacing device, a bolt or pin extending through the said spacing device and connecting the plates of the carriage cross-head together, and a chain carrying cutters and contacting with said wheel, substantially as set forth.

20. In a mining-machine, the combination with the bed, the carriage having a cross-head consisting of an upper and a lower plate, and a chain carrying cutters, of a bolt connecting the said plates of the carriage cross-head, a thimble loosely surrounding said bolt and extending continuously from one plate of said cross-head to the other and having an oil-receptacle at its upper end, said thimble having one end engaged with one of the plates of said cross-head, whereby it is held stationary, and a passage for conducting oil from said oil-receptacle to the exterior of the thimble, and a chain-guiding wheel fitted about and having a bushing contacting with the said spacing-thimble, substantially as set forth.

21. In a mining-machine, the combination with the cutter-chain, the bed, and the carriage which supports the chain, of the stay or holding device rigidly secured to the upper side of the carriage and consisting of a plate or bar formed with one or more cutting-points, and a separately-formed shoe or support below the carriage, independent of the stay or holding device above the carriage, substantially as set forth.

22. In a mining-machine, the combination with the bed, the cutter-chain, and the carriage, of the stay or holder for the carriage consisting of a toothed plate of metal resting upon the top of the carriage and bearing against a shoulder or shoulders on the latter, and means supplemental to the said shoulder for detachably fastening the said stay rigidly to the carriage, substantially as set forth.

23. In a chain-cutter mining-machine, the combination of the laterally-acting cutter-chain, the chain-supporting carriage having a front cross-head formed of an upper and a lower plate, with a recess in the upper face of the upper plate, said plate being imperforate below said recess, the holding device formed of a toothed plate of metal adapted to serve both as a holder and as a groove-cutter when thrust directly forward under the pressure of the advancing carriage, means for rigidly fastening said holding-plate to the carriage-plate, as described.

24. In a mining-machine, the combination with the bed, the cutter-chain, and the carriage, of the shoe or runner secured to the under side of the carriage and formed with a series of ribs $o^3$, and means above the carriage and independent of said shoe for forcing the said ribs downward, substantially as set forth.

25. In a mining-machine having a bed, a cutter-chain, and a carriage for supporting the said chain, the combination with the carriage, of a stay or holding device O formed with one or more upwardly-projecting cutting-teeth rigidly secured to the carriage, and a shoe or runner O' independent of the stay O and secured to the under side of the carriage, substantially as set forth.

26. In a mining-machine, the combination with the bed-frame, and the cutter-chain, of the sliding carriage having a chain-supporting frame constructed with a cross-head, a single central supporting-bar, and two rearwardly-converging bars both rigidly connected to the central bar, the bed-frame having a guide formed of two vertically-arranged bars or plates between which the said central bar of the carriage travels, substantially as set forth.

27. In a mining-machine, the combination with the bed-frame having a guide at the front end formed of two vertically-arranged bars or plates, the cutter-chain, and the carriage having a chain-frame comprising a single central bar D' traveling between the said guide-plates on the bed, and the side chain-guides G' G' rigidly connected to the central bar D' and lying outside of the said guides on the bed, substantially as set forth.

28. In a mining-machine, the combination with the bed-frame, and the cutter-chain, of the sliding carriage having the cross-head for guiding the chain, the guide-wheels in said head, the central bar D', the brackets N' each having a bar n secured to the cross-head and a bar n', and the side guides G' for the chain both rigidly secured to the bars n' of the brackets N', at their front ends, and rigidly connected to the central bar D' at their rear ends, substantially as set forth.

29. In a mining-machine, the combination with the bed, and the cutter-chain, of the sliding carriage having the central pushing-bar D', the cross-head at the front of the carriage provided with projections extending backward from its ends, and the side guides G' for the chain secured rigidly to the said backward-extending projections of the cross-head and near their rear ends rigidly secured to the said central pushing-bar, said side guides being arranged substantially tangentially to the driving sprocket-wheel and the front guide-wheels respectively, substantially as set forth.

30. In a mining-machine, the combination with the bed and the cutter-chain, of the sliding carriage having a driving sprocket-wheel for the chain, a centrally-arranged push-bar, a cross-head at the front of the push-bar, side guides, as at G', for the chain rigidly connected at their front ends with the cross-head and at their rear ends both rigidly connected with the push-bar and each being arranged substantially tangential to the periphery of the driving sprocket-wheel and one of the front guide-wheels, said push-bar, side guides and cross-head being arranged to provide a triangular support and path for the chain in which path it travels directly on a substantially straight line from the rear driving sprocket-wheel to one of the front sprocket-wheels, and directly back on a substantially straight line from the front sprocket-wheel to the rear driving-wheel, and all of the parts of said frame being rigidly fastened together, substantially as set forth.

31. In a front-thrust chain-cutter mining-machine, the combination with the relatively small driving sprocket-wheel, whereby high power can be transmitted from a light engine or motor and from high-speed driving devices, and a cutter-chain supported on the lines substantially of a triangle, of a chain-frame having the relatively-elongated cross-head at the front on the base-line of said triangle, chain-supporting bars on the sides of the triangle and converging from the ends of the cross-head directly toward the said driving sprocket-wheel, and held rigidly together, and a longitudinal guide and thrust-bar for the chain-frame connected to the cross-head and to the side chain-guide rigidly, said cross-head, side guides and guiding thrust-bar all lying in the horizontal planes of the chain whereby the chain travels directly to and from the power-receiving point and to and from the working line with minimum resistance and minimum loss of power and cuts a horizontal kerf adapted to receive all of the guiding and thrusting parts of the triangular frame, substantially as set forth.

32. In a front-thrust undercutting mining-machine, the combination of a bed-frame having an upper horizontally-directed guideway and a lower guideway parallel thereto, an endless triangular cutter-chain provided with cutters and supported in horizontal planes coincident with those of the said lower guideway, a rear substantially quadrangular platform-frame for a motor and gearing moving along the upper guideway, a sprocket-wheel on said motor-frame engaging said cutter-chain and situated in the planes of the said lower guideway, a cross-head for the front part of the chain at the line of cut, and two inclined side chain supporting and guiding bars on the long sides of the triangle of the chain converging directly from the front chain-wheels to the rear driving sprocket-wheel, and means for connecting both of the said inclined side guide-bars rigidly to the motor-frame, substantially as set forth to impart forward pressure from said motor-frame to both ends of the cutter cross-head uniformly.

33. In a front-thrust undercutting-chain mining-machine, the combination of the endless cutter-chain provided with cutters and supported and traveling in a triangular path in horizontal planes, a cutter-carriage having rearwardly-converging rigidly-held chain-guiding bars at the sides of the chain triangle, a cross-head at the line of cut rigidly secured to said side bars and a motor-frame at the rear rigidly connected to both of said converging side chain-guiding bars, a stationary bed-frame for the carriage, and a guiding device interposed between the cutter-carriage and the bed-frame and composed of two elements, one element on the bed-frame and one on the carriage, one element having a bar situated directly in the central longitudinal vertical planes of the triangle of the chain and the other guide element being composed of two parallel bars fitted to the sides of the said central guide element, substantially as set forth.

34. In a chain-cutter mining-machine of the class described, the combination of the bed, the endless triangular cutter-chain, the carriage having the chain-frame and the motor-support, said chain-frame constructed to provide a substantially triangular horizontal guide for the chain supporting it at the apex at the sides of the triangle and at the front cross-head, a motor-support for carrying the motor and gearing, and a connecting device interposed between the motor-frame and the chain-frame and formed separately from the chain-frame but attachable thereto and separable therefrom and extending forward from the central part of the motor-frame, said centrally-arranged connecting device providing a guide element for alining the chain-frame and the motor-frame when the tension of the chain is adjusted.

In testimony whereof I affix my signature in presence of two witnesses.

HENRY B. DIERDORFF.

Witnesses:
CHARLES W. MILLER,
G. C. HORST.